(12) United States Patent
Du Fosse et al.

(10) Patent No.: US 8,868,615 B2
(45) Date of Patent: Oct. 21, 2014

(54) ENHANCED DATABASE SCHEME TO SUPPORT ADVANCED MEDIA PRODUCTION AND DISTRIBUTION

(75) Inventors: Eric Du Fosse, Portland, OR (US); Cassiano Durand, Portland, OR (US); Wilfried Reiner, Hessen (DE)

(73) Assignee: GVBB Holdings S.A.R.L., Luxembourg (LU)

( * ) Notice: Subject to any disclaimer, the term of this patent is extended or adjusted under 35 U.S.C. 154(b) by 360 days.

(21) Appl. No.: 12/450,711

(22) PCT Filed: Apr. 3, 2008

(86) PCT No.: PCT/US2008/004357
§ 371 (c)(1),
(2), (4) Date: Oct. 8, 2009

(87) PCT Pub. No.: WO2008/127570
PCT Pub. Date: Oct. 23, 2008

(65) Prior Publication Data
US 2010/0088311 A1    Apr. 8, 2010

Related U.S. Application Data

(60) Provisional application No. 60/923,357, filed on Apr. 13, 2007.

(51) Int. Cl.
*G06F 17/30* (2006.01)
(52) U.S. Cl.
CPC .... *G06F 17/30575* (2013.01); *G06F 17/30312* (2013.01); *G06F 17/30864* (2013.01); *G06F 17/30038* (2013.01)
USPC .......................................................... 707/802

(58) Field of Classification Search
USPC ......................................... 707/706, 736, 802
See application file for complete search history.

(56) References Cited

U.S. PATENT DOCUMENTS

| 5,432,597 A | 7/1995 | Parker et al. |
| 5,748,956 A * | 5/1998 | Lafer et al. .................... 715/863 |
| 6,721,747 B2 | 4/2004 | Lipkin |
| 6,748,382 B1 * | 6/2004 | Mohan et al. ........................ 1/1 |

(Continued)

FOREIGN PATENT DOCUMENTS

| CA | 2416889 | 1/2002 |
| CN | 1947090 A | 4/2007 |

(Continued)

OTHER PUBLICATIONS

Office Action for Chinese patent application No. 200880011946.0 mailed by the SIPO on Nov. 23, 2012 (20 pages).

(Continued)

*Primary Examiner* — Cam-Linh Nguyen
(74) *Attorney, Agent, or Firm* — Arent Fox, LLP

(57) ABSTRACT

An enhanced database system and method for media production and distribution enables the aggregation of assets using external unique IDs. The use of the external IDs allows the searching of Media Asset Management database to be performed without any prior knowledge of the actual database. The search configuration defines a set of search environment parameters that are imported into the search database during a configuration stage and which are used by the search services to provide client applications with an interface to create, validate, and execute queries.

22 Claims, 6 Drawing Sheets

(56) References Cited

U.S. PATENT DOCUMENTS

| | | | |
|---|---|---|---|
| 7,792,865 B2* | 9/2010 | Hamada et al. | 707/796 |
| 7,970,260 B2* | 6/2011 | Haot et al. | 386/278 |
| 2002/0143565 A1* | 10/2002 | Headings et al. | 705/1 |
| 2003/0233359 A1* | 12/2003 | Adolph et al. | 707/6 |
| 2003/0236886 A1* | 12/2003 | Oren et al. | 709/225 |
| 2004/0199867 A1 | 10/2004 | Brandenborg | |
| 2004/0230572 A1 | 11/2004 | Omoigui | |
| 2005/0210009 A1 | 9/2005 | Tran | |
| 2005/0262024 A1* | 11/2005 | Headings et al. | 705/59 |
| 2006/0149533 A1* | 7/2006 | Bogdanov | 704/205 |
| 2006/0206493 A1* | 9/2006 | Lipscomb et al. | 707/10 |
| 2006/0236221 A1* | 10/2006 | McCausland et al. | 715/500.1 |
| 2007/0038610 A1* | 2/2007 | Omoigui | 707/3 |
| 2007/0107032 A1* | 5/2007 | Rachamadugu | 725/114 |
| 2007/0133609 A1* | 6/2007 | Moore et al. | 370/484 |
| 2008/0086689 A1* | 4/2008 | Berkley et al. | 715/731 |
| 2008/0109482 A1* | 5/2008 | Macchletti et al. | 707/104.1 |
| 2008/0140433 A1* | 6/2008 | Levy et al. | 705/1 |

FOREIGN PATENT DOCUMENTS

| | | |
|---|---|---|
| EP | 0945864 | 9/1999 |
| EP | 1643432 | 4/2006 |
| GB | 2260051 A | 3/1993 |
| GB | 2348280 A | 9/2000 |
| JP | 2005514673 A | 5/2005 |
| JP | 2006221399 A. | 8/2006 |
| KR | 1020010081875 | 12/2001 |
| WO | WO01167309 | 9/2001 |
| WO | 03001413 A | 5/2005 |
| WO | WO2006065594 | 6/2006 |

OTHER PUBLICATIONS

Chinese Office Action dated Nov. 23, 2012; Chinese Application No. 200880011946.0.

Nishino, Yoshinori, et al.; "A method for structuring a product database search agent in a distributed environment," Journal of the Information Processing Society of Japan, Japan, Information Processing Society of Japan, Jan. 15, 1999, vol. 40, No. 1, pp. 253-263.

Notification of Reasons for Refusal in Japanese Application No. JP 2010-503022 dated Dec. 11, 2012.

European Extended Search Report in application No. 05852921.5 dated Jan. 17 2013.

First China Office Action dated May 11, 2011 re Application No. CN200880011946.0.

Second China Office Action dated Apr. 20, 2012 re Application No. CN200880011946.0.

* cited by examiner

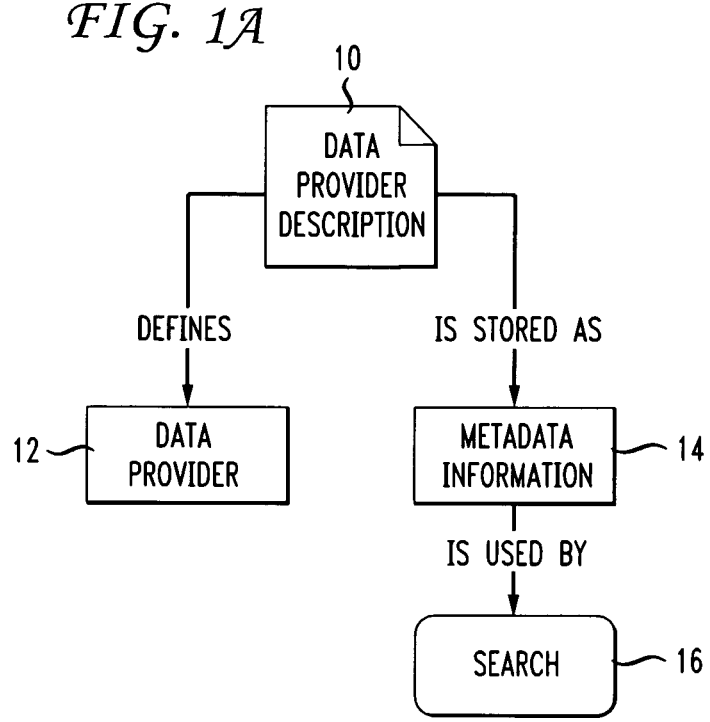

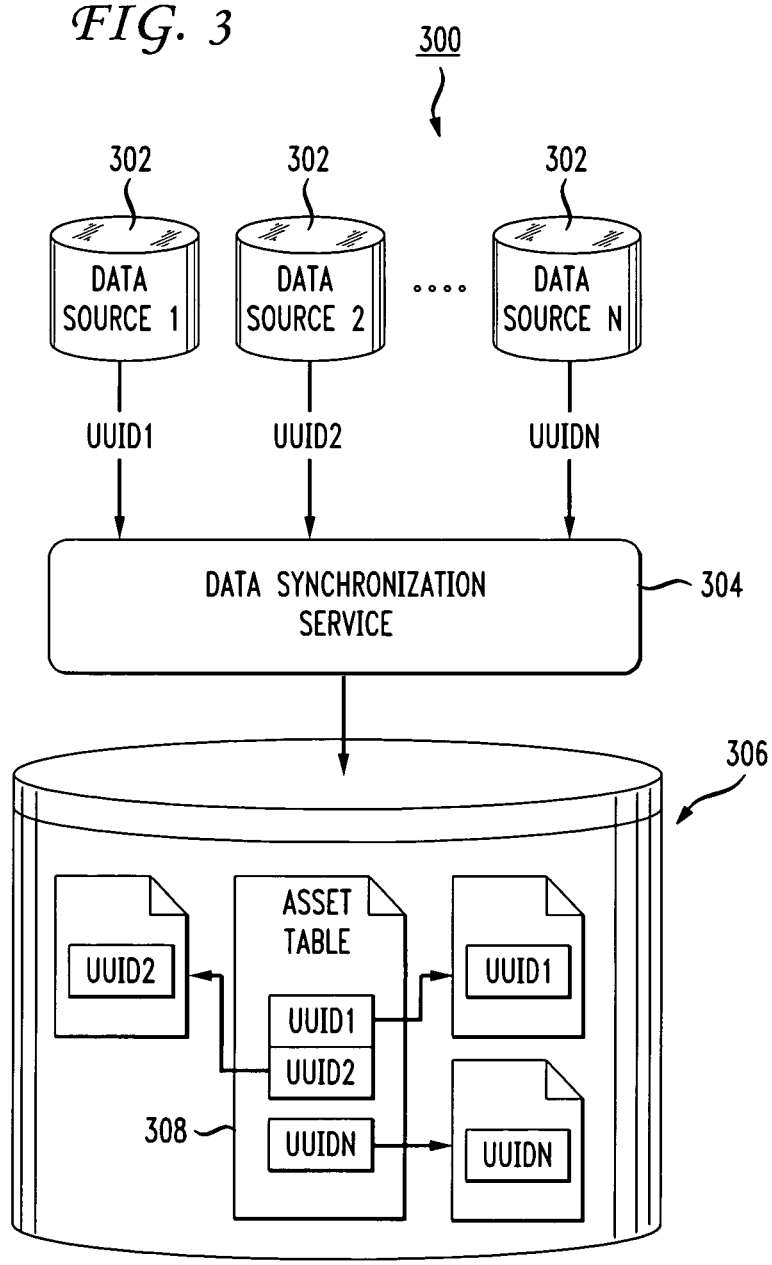

FIG. 5

| ENTITIES | | |
|---|---|---|
| PK | Id | uniqueidentifier |
| | Name | nvarchar(50) |
| | Alias | nvarchar(50) |
| | IsDynamic | bit |
| | IsView | bit |
| | IsDataProvider | bit |
| | Description | nvarchar(2000) |
| | Created | datetime |
| | Modified | datetime |

| Columns | | |
|---|---|---|
| PK | Id | uniqueidentifier |
| FK1 | TableId | uniqueidentifier |
| | TypeId | uniqueidentifier |
| | Name | nvarchar(50) |
| | Alias | nvarchar(50) |
| | DataType | nvarchar(50) |
| | IsUnique | bit |
| | IsFtSearchale | bit |
| | IsFilterable | bit |
| | IsOrderable | bit |
| | Is Encrypted | bit |
| | Is Dynamic | bit |
| | Description | nvarchar(2000) |
| | Created | datetime |
| | Modified | datetime |

ENHANCED DATABASE SCHEME TO SUPPORT ADVANCED MEDIA PRODUCTION AND DISTRIBUTION

This application claims the benefit, under 35 U.S.C. §365 of International Application PCT/US2008/004357 filed Apr. 3, 2008, which was published in accordance with PCT Article 21(2) on Oct. 23, 2008 in English and which claims the benefit of U.S. provisional patent application No. 60/923,357 filed Apr. 13, 2007.

TECHNICAL FIELD

The present concepts relate to a system and method for managing and distributing content across a network. More particularly, it relates to a system for supporting and handling metadata aggregation and synchronization between different applications in media production and distribution.

BACKGROUND ART

In the media industry, solutions for addressing specific asset management needs are now converging to in an effort to provide a global solution for Media Asset Management (MAM) with different levels of workflow management support. These solutions include:

Playout Automation Systems

Present day playout automation techniques provide real time control of devices that playout video and audio Content according a schedule. Some playout techniques address the need to organize movement of Content at the receiving or ingest server and at the storage phase. The providers of playout devices have demonstrated, an expertise in device interfaces, but are still evolving to support workflow engines. Currently, playout automation solutions propose static workflows that need significant rework at the configuration stage.

2) Document Asset Management:

Providers of document Asset management have served the print media and have demonstrated strength in managing documents. Many such providers have evolved into the multimedia environment to tackle the media industry. Typically, these providers lack expertise in real time device resource management and their automation solutions afford only limited ways to manage workflow.

3) Video Editing Systems

There exist several providers of video editing systems, at least one of which has introduced a non linear workflow solution for the media industry which only serves to manage workflow in a static way (i.e., not dynamic).

4) IT middleware Suppliers:

Providers of IT Middleware typically offer specialized business layer applications and associated infrastructure to manage a transactional layer to handle workflows. In practice, such suppliers focus on business layers so their solutions do not provide a user interface and cannot control resources with load balancing or quality of services constraints.

BRIEF SUMMARY OF THE PRESENT PRINCIPLES

Briefly, in accordance with a preferred implementation, there is provided a database scheme for supporting advanced media production and distribution. The database scheme introduces the concept of Edit Decision Lists (EDLs), Play Lists, and virtual essences associated to assets. Additionally, the database scheme establishes the concept of a group of assets, which allows the system to aggregate assets in a hierarchical entity, for which common operations are defined.

According to an implementation, the method of providing an enhanced database scheme to support media production and distribution includes encapsulating, into each of an aggregation of assets, an external specific identifier for a corresponding application associated with each asset, and querying the aggregation of assets for a given application using said specific identifier for that application to identify the asset associated with the specific identifier.

The encapsulating can include assigning a unique ID as the specific identifier to each asset, and forming an asset table in a Media Asset Management database using the specific identifier for each asset. This forming can also include establishing a virtual asset address within the Media Asset Management database using the specific identifier.

The querying can include defining one or more search environment parameters, and importing the defined parameters into a search database during configuration of the search. The defining of one or more search environment parameters includes identifying a description of metadata corresponding to each asset.

In accordance with another implementation, the method includes synchronizing search results from at least two data sources in response to a user search query, establishing a search configuration in response to the user search query, aggregating the synchronized search results from the at least two data sources, where the aggregating includes assigning a unique identification identifier for each application corresponding to a respective asset, and presenting the aggregated search results to the user as one search result. The aggregating can further include forming an asset table in a database by encapsulating the assigned unique identification identifier for each application. The establishing can further include defining search environment parameters involved in the search. The defining can further include identifying metadata descriptions associated with each asset, where the user search query is dynamically created for a database using the metadata description during the establishing of the search configuration.

According to a further implementation, the search environment parameters are imported into a search database during configuration of the search in response to the search query to provide client applications an interface to create, validate and execute the search query.

The details of one or more implementations are set forth in the accompanying drawings and the description below. Even if described in one particular manner, it should be clear that implementations can be configured or embodied in various manners. For example, an implementation can be performed as a method, or embodied as an apparatus configured to perform a set of operations or an apparatus storing instructions for performing a set of operations. Other aspects and features will become apparent from the following detailed description considered in conjunction with the accompanying drawings and the claims.

BRIEF DESCRIPTION OF THE DRAWINGS

In the drawings wherein like reference numerals denote similar elements throughout the views:

FIG. 1a depicts a block diagram of a database scheme that maps into a search engine according in accordance with an illustrative embodiment of the present principles;

FIG. 1b depicts an example of the database scheme of a sample data provider according to an illustrative embodiment of the present principles;

FIG. 3 depicts a flow diagram of a data aggregation method encapsulates unique Asset IDs according to an illustrative embodiment of the present principles;

FIG. 5 is an example of a search configuration concept in a relational database form according to an illustrative embodiment of the present principles.

DETAILED DESCRIPTION

Figure 1C:
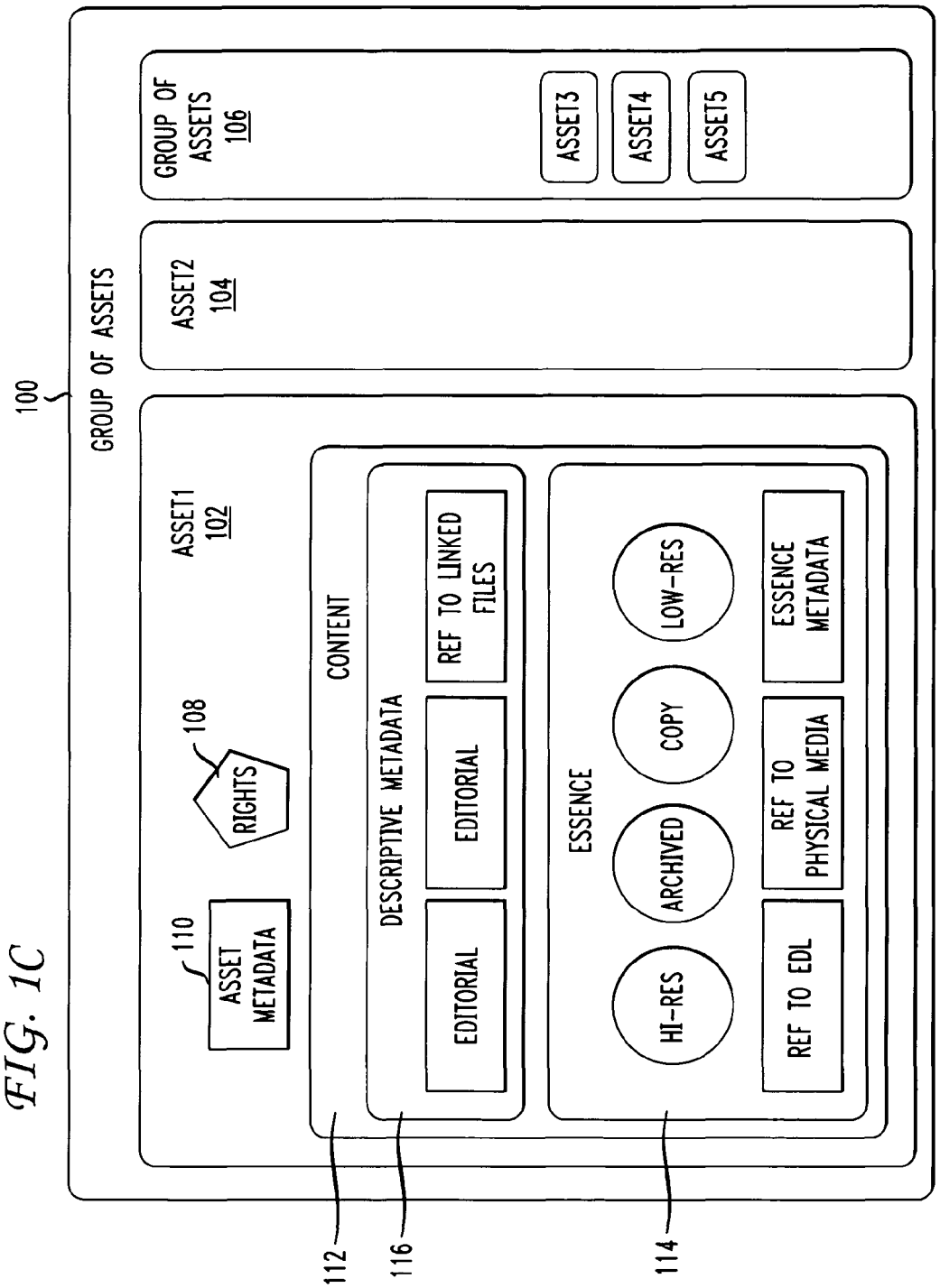
FIG. 1c depicts a representation of a group of assets according to an illustrative embodiment of the present principles.

The database scheme of the present principles addresses the problem of metadata aggregation and synchronization among different applications in media production and distribution. The database scheme accomplishes this task by allowing the encapsulation of unique identifiers (UIDs) in the asset abstraction.

Furthermore, the database scheme of the present principles provides a search framework that allows for the efficient retrieval and aggregation of information from multiple sources (databases, files, sites). Another unique feature of the database scheme of the present principles is its ability to search on any database with just configuration changes and without requiring any source code change.

To improve deployment modern infrastructure in the broadcast and post-production environment, the database scheme of the present principles supports metadata that addresses a number of specific aspects not addressed by present day approaches. For example, the database scheme of the present principles supports virtual asset addresses A global Media Asset Management (MAM) solution that cannot properly package essences and metadata will have a limitation at the publishing stage, a disadvantage overcome by the present database scheme. The present database scheme also handles metadata that is not in the database. The present database scheme solves this problem by using multiple IDs, thus providing the capability to manage large number of assets a logical entity. The current state of the art for database searching requires the users to recompile a predefined search configuration that understands the database scheme. The database scheme of the present principles allows users to define an external scheme that can map into a search engine.

As can be appreciated by reference to FIG. 1a, the database scheme of the present principles makes use of the concept of data providers 10 based on which data from generic sources can be published in a Media Asset Management (MAM) database and associated with an asset or other entities, such as essences and groups. As seen in FIG. 1A, new data providers 12 are created dynamically by specifying the structure of the data to be published. This description contains all metadata fields published, with their respective attributes, such as name, type, location, and whether the metadata field is searchable, orderable, encrypted, among other attributes. This information is stored as Metadata Information 14, and is used by other services, such as search 16.

FIG. 1b shows an example of the database scheme of a sample data provider. An implicit relationship exists between the data provider and the entity to which is determined by the pair (ObjectId, ObjectTypeId). For example, if a data provider publishes data for assets, then ObjectTypeId will be the unique identified associated to Asset type. The properties column is a meta-column that stores the bulk of the properties of a data provider. In actuality, the structure of all data providers is the same and the only difference is the Properties column, which differs based on the type of data provider. The database stores the information about all dynamic properties contained in the Properties column.

As compared to prior content management solutions, the database scheme of the present principles enables management of content and assets around a solution focused on an operation workflow that offers the following features:

A dynamic user interface task base that allows each user to have the description of their task, the resource required to execute their task with a unique way to link content with asset, manually or automatically.

An advanced MAM structure that provides a sufficient level of abstraction to manage a centralized search in complex media creation environment.

A Content Agnostic solution with the capability to manage a logical element group of assets.

The evolution of digital media production has been motivated by the increasing need to combine and administer volumes of complex data. As a result, new techniques to represent, aggregate, and manage digital data have emerged. The need for a common vocabulary resulted in the standardization of data nomenclature, representation, transport, and storage.

Central to digital media management is the concept of a digital asset, which, in general terms, is defined as an entity of value that can be published in some media and which its owner has the right to use. In practical terms, an asset is simply an aggregator of information; e.g., a shell which, in the case of a digital asset, can contain references to video and audio files, referred as essences, as well as to metadata. Those of skill in the art recognize that the basic definition of "metadata" is data about data.

The following description will show the concepts and frameworks of the present principles that augment the vocabulary of media asset management and provide solutions to problems commonly encountered in the field. All these solutions are achieved by enhancing the database scheme at the core of the MAM system.

Group of Assets

FIG. 1c, depicts a Group of Assets 100. The Group of Assets 100 provides the means to aggregate assets in a hierarchical entity for which metadata and operations are defined. The group of assets 100 includes a number of assets 102, 104 or a group of assets 106, all handled as an administrative entity. By way of example, each Asset includes: (a) rights 108 which dictates access to the asset 102, (b) Asset metadata 110, (c) content 112, and (d) Essence 114. The content 112 also includes descriptive metadata.

There exist several operations that for the group of assets 100. Such operations can include: archival, transfer and deletion, among others. As a practical application, all the assets whose essences are located in a specific DVD, could be grouped together. Asset 106 shows an example of this where Asset3, Asset4 and Asset5 have been grouped together.

As a relational entity, a group of assets 100 will possess its own unique ID and will have associated metadata and specific rights. In an exemplary implementation, each Asset should have an associated ID when discovered or generated by the system.

Edit Decision Lists (EDLs) and Play Lists as Virtual Essence

An asset can be linked to a number of essences that represent the same content or part of the content. In general, the term "essence" is used when referring to "raw" media files, i.e. the files containing bytes representing the image and/or audio.

Figure 2A:
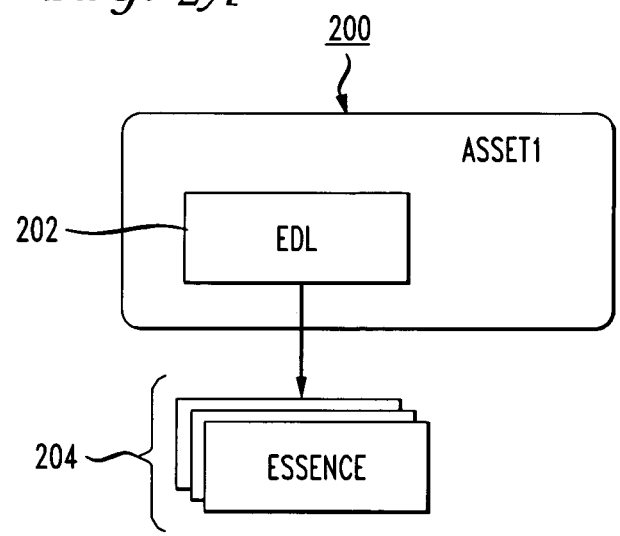
FIGS. 2a and 2b depict representations of virtual essences according to an illustrative embodiment of the present principles.
Figure 2B:
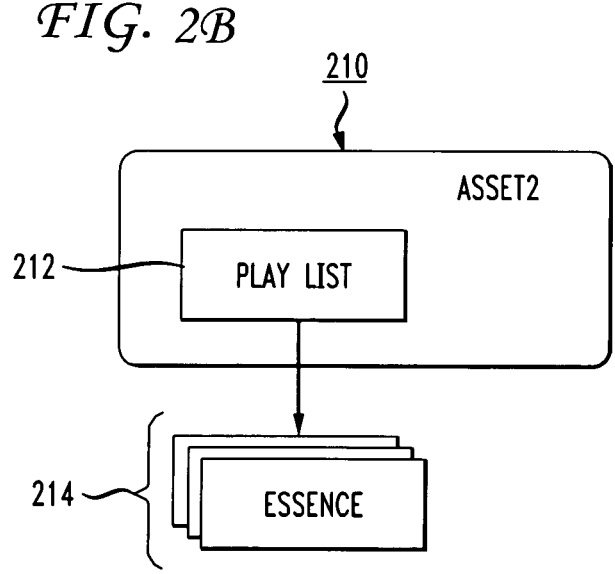

FIGS. 2a and 2b depict examples of Assets 200 and 210, respectively, according to Editing and Transmission/Distribution environments, respectively.

In the Editing environment (FIG. 2a), the result of an editing task (within Asset 200) can be represented by an EDL 202, which contains references to the actual essences 204. The EDLs can be rendered, a process which creates an essence (raw media file) resulting from the task.

Analogously, in a Transmission/Distribution environment, multiple essences 214 are placed in a timeline, resulting in an entity referred to as Play List 212.

EDLs and Play Lists are referred as virtual essences and can be associated with assets 200 and 210, respectively. An EDL is a list of pointers referring to a sequence of segments from one or multiple pieces of media. To handle such media as an essence simplifies the manipulation as a logical element in the system. A typical example is the capability to browse the virtual file as a clip in a media player for approval purposes or to create a physical file via a conformance engine in one point of the workflow process.

Data Aggregation and Synchronization Via External Unique Ids (UUIDS)

As mentioned above, the database scheme of the present principles presents a framework that provides data aggregation via the encapsulation of external unique IDs in the asset description.

FIG. 3 depicts an aggregation process 300 according to an illustrative embodiment of the present principles. A database 306 in a Media Asset Management System (MAM) allows the association of external UUIDs for different applications 302-1, 302-2, 302-n. A synchronization service 304 manages the linkage of the data in the data sources 302 to the central database 306 in the MAM. Optionally, the data in the data sources can be mapped to the MAM database 306 to speed up the search process.

In the example shown, the MAM database 306 forms an asset table where the data from the respective sources 302 are aggregated by encapsulating the respective UUIDs for the respective applications. By way of example, the sources 302 represent external databases that stores related assets. For instance a rights management system will refer to the same asset as the main system but only the number of metadata pieces will be common between the two databases. For instance, the main database will have a movie asset with the video clip and some technical metadata and will synchronize with the database of the rights management system to know if the company still has the right to broadcast the movie.

Centralized Search

Searching and indexing have been developed to optimize data retrieval and asset identification according to the present principles. The search has to encompass all information associated with the asset, either located in a database or files, and even in sites located geographically apart. In addition, the search results need to be presented in various formats to accommodate the different needs of the different systems and applications involved in media production and distribution.

Figure 4:
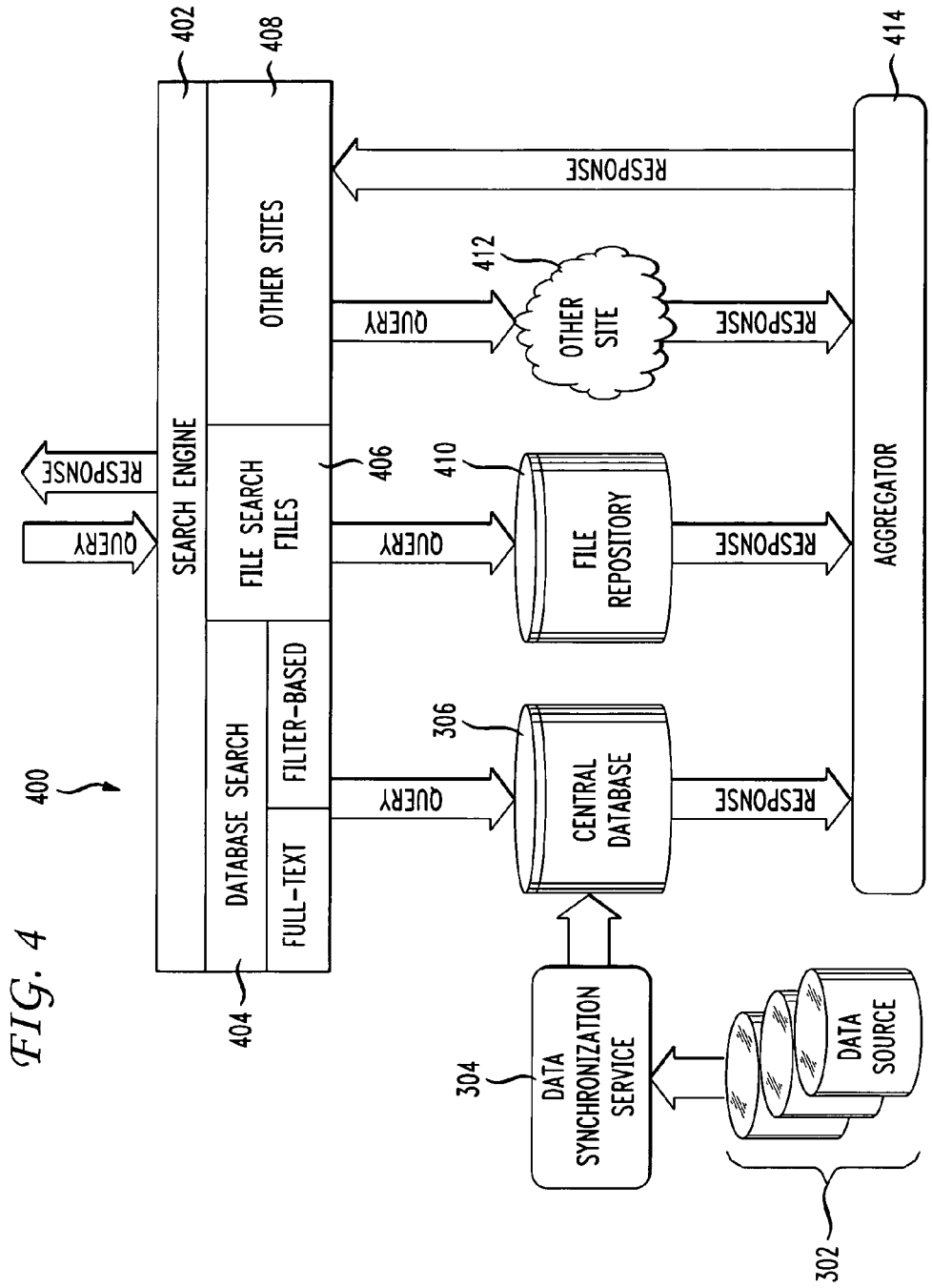
FIG. 4 depicts an overview diagram of a search framework according to an illustrative embodiment of the present principles.

FIG. 4 shows an overview of a search framework 400 according to an illustrative embodiment of the present principles. Queries are received at a search engine 402 and are then centralized or forwarded to one or more locations such as: (a) the MAM database 306, (b) one or more file repositories 410, and (c) one or more different sites 412 through the database search 404, file search files 406 and other sites 408, respectively. The responses are consolidated in by the aggregator service 414 before they are sent to the user.

The search engine 402 exposes the search capabilities via a service interface depending on the nature of the search, one or more algorithms applied. The database search 404 uses the Metadata Information to create dynamic queries for a specific database. This is referred as a Database agnostic search, since it can be applied to any database, once the Metadata Information has been defined. Data from multiple sources (302) are also considered in the database agnostic search, since the data is published and kept synchronized via the data synchronization service 304. A File Search 406 function allows the search of filets of various types in a file system. The other sites 408 allow searching multiple sites. The aggregator receives the responses from all the searches and aggregates the results into one before responding the original request.

The Search Configuration

The search configuration defines the search environment parameters, which can include information on the views, tables, and columns involved in the search. This information is imported into the search database during configuration and used by the search services to provide client applications an interface to create, validate, and execute queries. The configuration will determine how to search for content.

The search configuration allows the search services to be agnostic from the actual database, therefore providing flexibility and portability of the services to any other database.

TABLE 1

Example of Search Configuration

```
<?xml version='1.0' encoding='utf-8' ?>
<!-- Search Configuration (install time) -->
<Search>
    <Scheme>
        <Table name='MetadataTbl' alias='Metadata'
        IsDynamic='true'>
            <Column name='metadataID' alias='metadataID'
type='uniqueidentifier' IsUnique='Yes' IsFTSearchable='No'
IsFilterable='No' IsSortable ='No'/>
            <Column name='URN' alias='URN'
type='uniqueidentifier' IsUnique='Yes' IsFTSearchable='No'
IsFilterable='No' IsSortable ='No'/>
            <Column name='metadataName' alias='AssetName'
type='nvarchar' IsUnique='No' IsFTSearchable='Yes' IsFilterable='Yes'
IsSortable ='Yes'/>
        </Table>
        <!-- Add more tables here-->
        <Table name='Host'>
            <Columns>
            </Columns>
        </Table>
    </Scheme>
    <!-- Search Types and their associated tables/views (install time) -->
    <SearchTypes>
        <SearchType name='AssetSearch' From='AssetView'>
            <Table name='MetadataTbl'/>
            <!-- Add more tables here-->
        </SearchType>
    </SearchTypes>
</Search>
```

Table 1 shows an example of a search configuration according to an implementation. The Scheme element defines the structure of the database to be searched. The Table element contains the description of all the columns in that table (or view) as well as attributes for the table alias and whether the table is dynamic (i.e. its scheme can change at run-time). The search services need to monitor the structure of the dynamic tables and update the search database and recreate the associated views if necessary. The column element contains the attributes for a column:

Name: Name of the column
Alias: Display name of the column
Type: SQL type of the column
IsUnique; Indicates whether the column is unique. Either a primary key or a column with a unique index.
IsFTSearchable: Indicates whether the column has a full-text index.
IsFilterable: Indicates whether we can create a filter on the column.
IsSortable: Indicates whether we can sort on the column.

This representation can be stored in a relational form in the database. FIG. 5 shows an example of this search configuration concept in a relational database form. As described, the search configuration depends on the metadata description. This is shown in FIG. 5, where for the each entity in the database, a new record in the entity table is generated. In this table, we define: Name; Alias; IsDynamic; IsView; IsDataProvider; and Description. For each property/column in the database we have a corresponding column in the Columns table, where we define: Table ID; Type ID; Name; Alias; Data type; IsUnique; IsFtSchedule; IsFilterable; Is Orderable; IsEncrypted; IsDynamic; and Description.

The embodiment described herein can be implemented in, for example, a method or process, an apparatus, or a software program. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device.

Additionally, the methods can be implemented by instructions being performed by a processor, and such instructions can be stored on a processor-readable medium such as, for example, an integrated circuit, a software carrier or other storage device such as, for example, a hard disk, a compact diskette, a random access memory ("RAM"), or a read-only memory ("ROM"). The instructions can form an application program tangibly embodied on a processor-readable medium. As should be clear, a processor can include a processor-readable medium having, for example, instructions for carrying out a process. As should be evident to one of skill in the art, implementations can also produce a signal formatted to carry information that can be, for example, stored or transmitted. The information can include, for example, instructions for performing a method, or data produced by one of the described implementations. Such a signal can be formatted, for example, as an electromagnetic wave (for example, using a radio frequency portion of spectrum) or as a baseband signal. The formatting can include, for example, encoding a data stream, packetizing the encoded stream, and modulating a carrier with the packetized stream. The information that the signal carries can be, for example, analog or digital information. The signal can be transmitted over a variety of different wired or wireless links, as is known.

A number of implementations have been described. Nevertheless, it will be understood that various modifications can be made. For example, elements of different implementations can be combined, supplemented, modified, or removed to produce other implementations. Additionally, one of ordinary skill will understand that other structures and processes can be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

The invention claimed is:

1. A method of media asset management comprising the steps of:
   encapsulating into each of an aggregation of assets an external specific identifier associated with each asset for a corresponding application, wherein the asset comprises references to a media essence with corresponding production rights, wherein the aggregation of assets also has a unique identifier, wherein the productions rights comprise metadata, and the external specific identifier is associated with specific media production and distribution rights, and wherein the external specific identifier is stored separately from a database storing the essence; and
   querying the aggregation of assets with a given application using said specific identifier for that application to identify at least one asset associated with said identifier.

2. The method according to claim 1, wherein the encapsulating comprises:
   assigning a unique ID as the identifier to each asset.

3. The method according to claim 1, wherein the encapsulating further comprises forming an asset table in the database using the identifier for each asset.

4. The method according to claim 3, where said forming further comprises establishing a virtual asset address within the database using the identifier.

5. The method according to claim 1, wherein the querying comprises:
   defining at least one search environment parameter; and
   importing the at least one defined parameter into a search database during configuration of the search.

6. The method according to claim 5, wherein said defining of at least one search environment parameter comprises identifying a description of metadata corresponding the at least one asset.

7. The method according to claim 1, further comprising identifying metadata associated with the at least one asset, wherein at least one query is dynamically created for a database using metadata descriptions.

8. The method according to claim 1, further comprising:
   encapsulating into the at least one asset a second unique identifier for a corresponding second application associated with the asset; and
   forming an asset table in the database using the identifier for each asset, wherein the asset table identifies the first identifier and the second unique identifier.

9. The method according to claim 1, further comprising:
   encapsulating into the at least one asset a second unique identifier for a corresponding second application associated with the asset; and
   linking data in the application and the second application to the database storing the encapsulated first and second identifiers.

10. The method according to claim 1, wherein the application comprises at least one selected from a group consisting of a media editing application, a media distribution application, a media production application, and a media rights management application.

11. The method according to claim 10, wherein the media rights management application is separate from a database storing the essence.

12. A computer program product comprising a non-transitory computer useable medium having computer readable program code embodied thereon for use in media production and distribution environment, the computer program product comprising:
- program code for encapsulating into each of an aggregation of assets an external specific identifier associated with each asset for a corresponding application, wherein the asset comprises references to a media essence with corresponding production rights, wherein the aggregation of assets also has a unique identifier, further wherein the productions rights comprise metadata, and the external specific identifier is associated with specific media production and distribution rights, and wherein the external specific identifier is stored separately from a database storing the essence; and
- program code for querying the aggregation of assets with a given application using said specific identifier for that application to identify at least one asset associated with said identifier.

13. The computer program product according to claim 12, wherein the program code for encapsulating further comprises program code for assigning a unique ID as the specific identifier to each asset.

14. The computer program product according to claim 12, wherein the program code for encapsulating further comprises program code for forming an asset table in a Media Asset Management database using the specific identifier for the at least one asset.

15. The computer program product according to claim 14, where said program code for forming further comprises program code for establishing a virtual asset address within the database using the identifier.

16. The computer program product according to claim 12, wherein the program code for querying further comprises:
- program code for defining at least one search environment parameter; and
- program code for importing the at least one parameter into a search database during configuration of the search.

17. The computer program product according to claim 16, wherein said program code for defining of at least one search environment parameter comprises program code for identifying a description of metadata corresponding the at least one asset.

18. The computer program product according to claim 12, further comprising program code for identifying metadata associated with the at least one asset, wherein at least one query is dynamically created for a database using metadata descriptions.

19. The computer program product according to claim 12, further comprising:
- program code for encapsulating into the at least one asset a second unique identifier for a corresponding second application associated with the asset; and
- program code for forming an asset table in the database using the identifier for each asset, wherein the asset table identifies the first identifier and the second unique identifier.

20. The computer program product according to claim 12, further comprising:
- program code for encapsulating into the at least one asset a second unique identifier for a corresponding second application associated with the asset; and
- program code for linking data in the application and the second application to the database storing the encapsulated first and second identifiers.

21. The computer program product according to claim 12, wherein the application comprises at least one selected from a group consisting of a media editing application, a media distribution application, a media production application, and a media rights management application.

22. The computer program product according to claim 12, wherein the media rights management application is separate from a database storing the essence.

* * * * *